United States Patent [19]
Kuc, Sr.

[11] Patent Number: 5,494,510
[45] Date of Patent: Feb. 27, 1996

[54] METHOD OF PRODUCING AN ASPHALT PRODUCT

[76] Inventor: John Kuc, Sr., 221 Pusey Mill Rd., Lincoln University, Pa. 19352

[21] Appl. No.: 380,310

[22] Filed: Jan. 30, 1995

[51] Int. Cl.$^6$ .................................................. C09D 195/00
[52] U.S. Cl. .............................. 106/269; 106/278; 524/62
[58] Field of Search ........................ 524/62; 106/269, 106/278

[56] References Cited

U.S. PATENT DOCUMENTS

| | | | |
|---|---|---|---|
| 3,919,148 | 11/1975 | Winters et al. | 106/278 |
| 4,085,078 | 4/1978 | McDonald | 404/72 |
| 4,139,397 | 2/1979 | Yan | 106/278 |
| 4,211,576 | 7/1980 | Yan | 106/278 |
| 5,114,648 | 5/1992 | Kuc, Sr. | 264/134 |
| 5,304,576 | 4/1994 | Martinez | 521/41 |

FOREIGN PATENT DOCUMENTS 326202   1/1972   U.S.S.R. ................. 106/269

*Primary Examiner*—David Brunsman
*Attorney, Agent, or Firm*—Morton J. Rosenberg; David I. Klein

[57] ABSTRACT

This invention provides for a method of producing an asphalt product which includes initially shredding scrap tires within a shredder system (14) where at least partially vulcanized rubber composition is formed into particulates less than approximately 2.0 mm in dimension. Metal is removed from the scrap tires and the resulting composition leaving the shredder system (14) is mixed in particular weight percentages with a chemical composition for insertion into a masticator system (28) which includes a first zone (42), a second zone (44), and a third zone (46). The masticator system (28) heats the composition entering to a temperature approximating 485° F. in the first zone (42). The composition is then cooled to a temperature within the approximating range of 230° F.–250° F. in second zone (44) and then slightly re-heated to a temperature within the range of 290° F.–350° F. in the third zone (46). Compounding of the composition is provided within the first zone (42) and there is formed a non-thermoset and non-thermoplastic polymer asphalt modifier composition which is then blended with liquid asphalt binder to produce the final asphalt product used in construction or road paving.

22 Claims, 1 Drawing Sheet

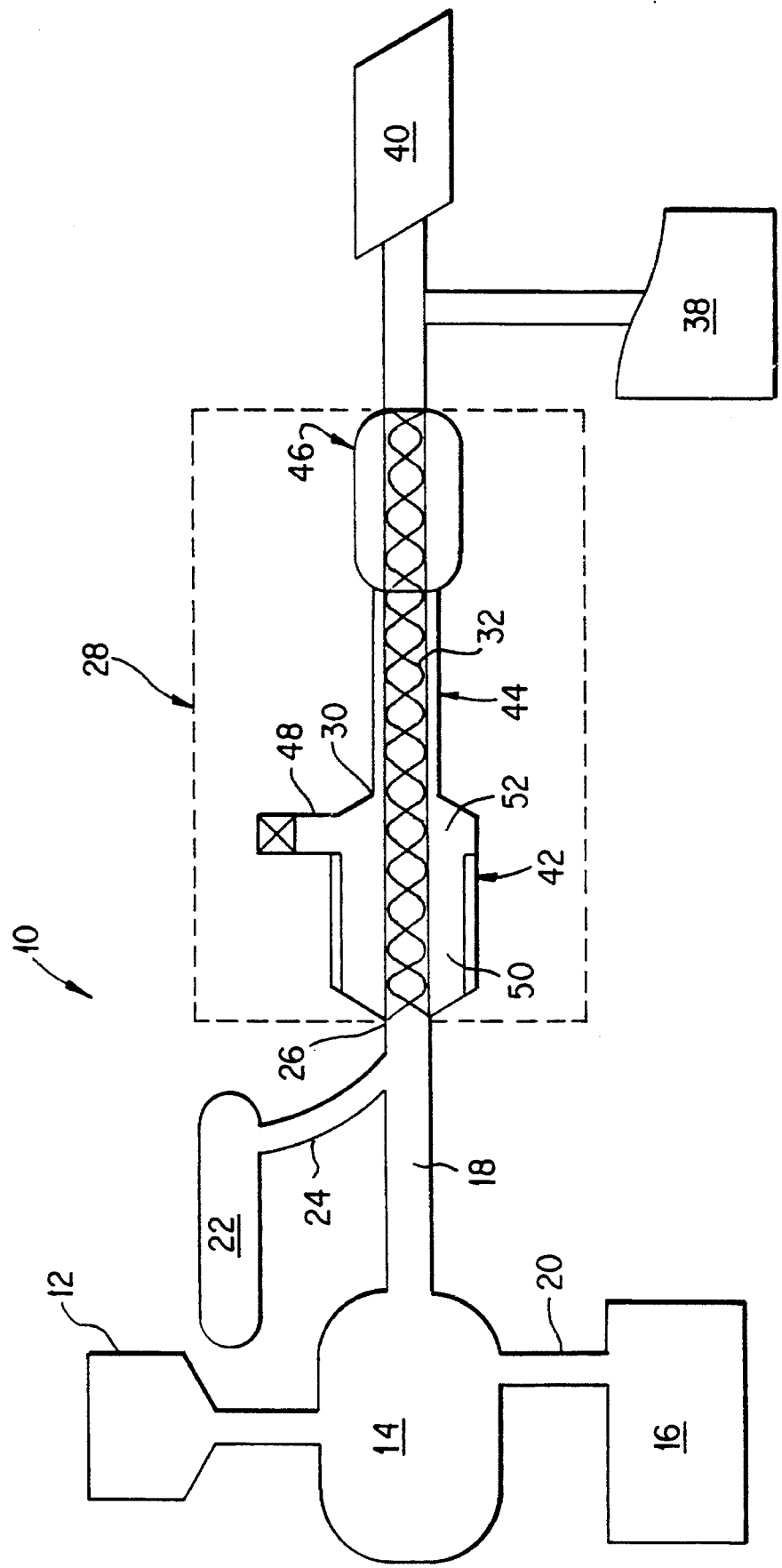

METHOD OF PRODUCING AN ASPHALT PRODUCT

BACKGROUND OF THE INVENTION

1. Field of the Invention

This invention pertains to a method of producing an asphalt product which is useful in a wide variety of applications including but not limited to road paving construction materials, roofing materials, as well as asphalt paints.

As a further provision, this method invention describes a process for producing an asphalt modifier composition which is neither a thermoplastic nor a thermosetting compound for inclusion into a liquid asphalt binder for producing the asphalt product.

In particular, this invention is directed to a method of producing an asphalt product whereby scrap tires are reclaimed in the overall process and form an important constituent ingredient of the final asphalt product being produced. More in particular, this invention directs itself to a method of producing an asphalt product where initially scrap tires are comminuted to a size approximating 2.0 mm or smaller in dimension and are then mixed with a chemical mixture in predetermined weight amounts where the chemical mixture is formed of recycled materials and includes a combination of fatty acids and organic hydrocarbon solvents as well as inorganic hydrocarbon solvents.

Still further, this invention pertains to the formation of a first intermediate mixture composition including shredded scrap tires and a chemical mixture formed of fatty acids and organic and inorganic hydrocarbon solvents which are inserted into a masticator system for passage therethrough.

More in particular, this invention pertains to the formation of a first intermediate mixture composition heated from room temperature to approximately 485° F. in a first heating zone of a masticator which compounds all of the first intermediate composition mixture and melts polyester fibers which may be contained in the scrap tires. Subsequently, the heated first intermediate mixture is then cooled to below vulcanization temperatures in a second zone of the masticator which forms a second intermediate mixture composition. Still further, this invention directs itself to a re-heating of a cooled second intermediate mixture composition to relieve the mixture of thermosetting properties within a third zone of the masticator system.

Additionally, this invention directs itself to the production of a non-thermoset and non-thermoplastic polymer asphalt modifier composition which may be incorporated into a liquid asphalt binder in either a wet or a dry process resulting in an asphalt product which includes the stable non-thermoset and non-thermoplastic modifier composition and allows increased viscosity of the final asphalt product while maintaining pumpability for particular uses.

2. Prior Art

Prior art systems have been developed for use of scrap tires in various processes in order to reclaim and optimize the utilization of scrap tires which at the present time are either incinerated or buried underground. However, it is not known that any processes have been developed which cause a compounding or polymerization of the scrap tires for producing a non-thermoset and non-thermoplastic polymer asphalt modifier composition to be incorporated within asphalt binders to produce a useful asphalt product.

SUMMARY OF THE INVENTION

A method of producing an asphalt product is provided where initially a chemical mixture formed of a combination of fatty acids and hydrocarbon solvents is established. The chemical mixture is blended to a partially vulcanized rubber composition in a predetermined weight ratio to form a first intermediate mixture composition. The first intermediate mixture composition is introduced to a masticator and the first intermediate mixture composition is heated to a first predetermined temperature within a first zone of the masticator. Sequentially, the first intermediate mixture composition is cooled to a second predetermined temperature within a second zone of the masticator to form a second intermediate mixture composition. The cooled second intermediate mixture composition is then re-heated to a third predetermined temperature within a third zone of the masticator to form a final mixture composition. The final mixture composition is then extruded from the masticator and incorporated into a liquid asphalt binder to form an improved asphalt product.

BRIEF DESCRIPTION OF THE DRAWING

The FIGURE is a block diagram of the process for producing the asphalt product of the subject invention concept.

DESCRIPTION OF THE PREFERRED EMBODIMENTS

Referring now to the Figure, there is shown asphalt modifier system 10 used in the method of producing the subject asphalt product as herein described. As will be discussed in the following paragraphs, the resulting final mixture composition is a non-thermoset as well as a non-thermoplastic polymer compound which is added to a liquid asphalt binder to produce the subject asphalt product. The final mixture composition exiting from the masticator as herein produced enhances the properties of the asphalt in both high and low temperature applications and increases the viscosity of the liquid asphalt binder while maintaining the pumpability of the asphalt product. The softening point of the asphalt binder is increased and thus reduces rutting and aging of asphalt when the final mixture composition or asphalt modifier is used in combination with the liquid asphalt binder for road asphalt applications. The resulting asphalt product with the inclusion of the asphalt modifier or final mixture composition provides for an optimized asphalt construction system when making cements, paints, or roofing asphalt.

In general, asphalt may be naturally occurring or may be formed from the residues of processing crude petroleum. Such residues yield asphalt which has for many years been a major road-building material. The asphalt is derived from petroleum in commercial quantities by removal of volatile components. Such results in an inexpensive construction material used primarily as a waterproofing, cementing, or road construction material.

Asphalt is composed of hydrocarbons and heterocyclic compounds which include nitrogen, sulfur, and oxygen. The components of the asphalt may vary in molecular weight from 400–5000. In general, the produced asphalt is thermoplastic and viscoelastic at high temperatures and over long load bearing times the asphalt may behave as a viscous fluid. At low temperatures or short loading times, asphalt may be treated as an elastic body.

There are three distinct types of asphalt formed from petroleum residues and are commercially classified as straight-run, air-blown, and cracked. The straight-run asphalt is in general characterized by a viscous fluid and is often used in the construction of pavement surfaces for roads. Air-blown asphalt is resilient and has a viscosity that is less susceptible to temperature change than that found in the straight-run asphalt and is generally used for roofing, pipe coating, paints, underbody coatings and paper laminates. Cracked asphalt has limited applications such as dust laying or as an insulation board saturant and has a substantially viscous flow with the viscosity being more dependent on temperature change than that found for straight-run asphalt.

Rubber waste materials may be in the form of used or scrap tires with their ultimate; disposal becoming an increasing problem in modern society. Numerous studies have been made for effective ways of disposal or utilization of scrap tires however, to date, although progress is being made, the use of used or scrap tires continues to be a problem area being worked upon in current technology research. Oftentimes, such rubber waste material such as scrap tires are either incinerated or buried underground with little use being made of the materials contained therein for further processing or development.

The subject invention as is provided by the method shown in the FIGURE directed to the asphalt modifier system 10 directs itself to producing a non-thermoset, as well as a non-thermoplastic polymer asphalt modifier compound or final mixture composition from scrap tires and possibly other thermoset materials.

The resulting asphalt modifier or final mixture composition which is produced by this inventive concept provides for a cost effective non-thermoset and non-thermoplastic polymer compound which modifies and enhances asphalt when such is used in road construction, roofing, coatings as well as asphalt paints.

The surprising discovery of the subject invention system and process is that a particular type of heating to a first predetermined temperature, sequentially followed by a cooling to a second predetermined temperature below the vulcanization temperature of rubber of the comminuted scrap tire which is blended in a combination with a particular chemical mixture compound produces a stable asphalt modifier which may be included and mixed with processed asphalt from petroleum residue to produce an improved asphalt compound.

A further surprising discovery of the subject invention process is that subsequent to the cooling of an intermediate mixture composition, that a slight reheating of the intermediate mixture to a third predetermined temperature within a third zone of a masticator relieves the overall mixture of still further thermoset properties and optimizes the final mixture composition for use with the liquid asphalt binder to form the improved asphalt product.

Referring now to the FIGURE, scrap tires or other at least partially vulcanized rubber compositions may be inserted into hopper 12. The scrap tires include the at least partially vulcanized rubber and in general polyester cords which will be referred to in further detail in following paragraphs.

The scrap tires are then charged into comminuter or shredder system 14 which incorporates therein a shearing cut, a debeading system and a shredding system. Shredder or comminuter system 14 is of the type shown and described in U.S. Pat. No. 5,024,386. Shredder system 14 directs itself to an overall system which not only debeads the tires but also cuts them diametrically into segments. The side walls of the tires are spread apart to provide segments in a substantially planar contour and then the segment is fed into a shredding cutter to cause the shredding of the tire while the segment is being maintained in the planar configuration. It is of importance that the shredded, granulated or comminuted scrap tires achieve a dimension of 2.0 mm or smaller. A range between 0.5–3.0 mm has been found to be useful however the preferred dimension size is 2.0 mm or smaller which allows for optimized removal of contaminants such as steel particles from the comminuted scrap tires. When the dimension begins to go above 2.0 mm in mesh size, it has been found that increased amounts of contaminants such as steelwires or other metallic segments within the scrap tires increases and reduces the overall effectiveness of the final mixture composition added to the asphalt liquid binder.

The overall system provided by shredder 14 allow crumbs to be delivered to a granulator which are then further reduced in size and the embedded wires contained therein are pulled from the crumbs. However, it is noted that the polyester cord fibers which are in the tire segments remain for compounding as will be further discussed. System 14 further may include a conveyor or other conduit which brings the crumbs to a magnetic separator in which the crumbs fall downwardly over a pair of magnetic drums.

The resulting elastomer and non-magnetic cord fiber is deposited on conveyor 18 while the steel particles and other contaminants may be delivered through chutes 20 to some type of steel scrap container 16 diagrammatically shown in the FIGURE and to be disposed of in some further operation, not part of the inventive concept as herein discussed.

The important portion of the resulting comminuted or shredded scrap tire incorporating the rubber composition and polyester fibers is then deposited on a conveyor-like system 18 for further processing in asphalt modifier system 10 in accordance with the steps as herein discussed.

A chemical mixture formed of a combination of fatty acids and hydrocarbon solvents is maintained in chemical mixture container 22 and is inserted or charged into conveyor or piping conduit 18 through chute or conduit 24 in predetermined weight concentrations to the at least partially vulcanized rubber composition inserted from shredder system 14. The chemical mixture within container 22 is a proprietary formula of recycled materials which includes among other ingredients, predetermined concentrations of oleic and linoleic acids which are non-aromatic with the overall chemical mixture composition having a specific gravity in the approximate range between 0.97–1.1 and a boiling point temperature at 1 atmosphere approximating 280° C. The chemical mixture is sold under the trade name of RUPOLM and is commercially available from TYREPLEX CORPORATION of Downingtown, Pa.

The chemical mixture is combined with the comminuted scrap tire shreds from shredder system 14 to produce or form a first intermediate mixture composition being inserted at entrance 26 of masticator system 28. Masticator system 28 includes an extruder or screw feed system 32. As is seen, masticator system 28 includes masticator first zone 42, masticator second zone 44 and masticator third zone 46 which will be further discussed in following paragraphs.

The blended first intermediate mixture composition introduced at entrance 26 of masticator first zone 42 has a chemical mixture weight to the comminuted rubber composition weight in the ratio within the approximate range of 1.0%–10.0% of chemical mixture to rubber shreds or particulates being inserted at entrance 26. It has been found that when the chemical mixture weight to rubber shred or particulate weight exceeds approximately 10.0%, that the viscosity of the overall final asphalt product increases to a level which reduces the pumpability of the asphalt product.

Additionally, when the chemical mixture weight to rubber shred or particulate weight reduces below 1.0%, that non-thermoset and non-thermoplastic properties of the final mixture composition are reduced which is a disadvantage when incorporated into the liquid asphalt binder.

Specifically, when the chemical mixture is less than 1.0% of the comminuted or rubber shreds, it has been found that not all of the resulting modifier composition or final mixture is compounded and thus there has been found some non-treated rubber particulates or shreds being passed through the overall system for insertion into the liquid asphalt binder which diminishes the ultimate physical properties necessary for inclusion in the asphalt product produced.

Masticator system 28 accepts the first intermediate mixture composition at entrance 26 at approximately room temperature such as 20° C. The first intermediate mixture then passes through masticator system first zone 42 through a plurality of heated sub-zones 50 and 52 which are contiguous and sequentially located within first zone 42 as is shown.

The first intermediate mixture is heated in first zone 42 from room temperature approximating 70° F.–485° F. at the first zone exit 30. The first intermediate mixture is heated in first sub-zone 50 from a temperature of 70° F. to approximately 200° F. The heated first intermediate mixture composition is then further heated to the final temperature of 485° F. in second sub-zone of masticator 28.

The first intermediate mixture composition heated in sub-zones 50 and 52 of masticator first zone 42 is compounded to produce a non-thermoset and non-thermoplastic second intermediate mixture composition exiting from first zone 42 at exit 30. The polyester fibers are melted and compounded with the vulcanized rubber scraps to form the second intermediate mixture composition in this stage of overall asphalt modifier system 10.

Heat is introduced into first zone 42 of masticator system 28 through either thermal radiation, conduction, high frequency induction, laser heating or any other method provided in the art. The important consideration being that the first intermediate mixture composition entering at entrance 26 be heated in contiguous sub-zones 50 and 52 from a temperature approximating room temperature to a temperature approximating 485° F. for passage external to first zone 42 at exit 30.

Additionally, vent 48 is provided in first zone 42 for removal of volatiles from the heated first intermediate mixture composition for external passage thereof and collection.

The heated first intermediate mixture composition then enters second zone 44 of masticator system 28 where it is cooled below vulcanization rubber temperatures. Cooling is effected in second zone 44 to a second predetermined temperature within the approximating range of 230° F. to 250° F. where it forms a second intermediate mixture composition which is continually mixed in second zone 44 and gradually cooled to a temperature within the aforementioned approximating range.

The second intermediate mixture composition then enters third zone 46 of masticator system 28 where the cooled second intermediate mixture composition is re-heated to a third predetermined temperature within the range of 290° F. to 350° F. through shear heating and relieves the rubber of further thermoset properties and further plasticizes the overall compound.

It is to be understood that the masticator or extruder system 28 may be a double arm masticator, a single or twin extruder, or a Banbury type mixer system well known in the art. Masticator system 28 may include a double arm mixer system for mastication as previously referred to in previous paragraphs and such is a commercially available double arm masticator that continuously feeds directly into screw feed 32 which may pelletize or extrude different profiles or calendars to produce the final mixture composition or asphalt modifier composition in granular form, particulate granules, or even in flake form.

Masticator system 28 may include a specially designed screw feed mechanism 32 which may be heated to produce the zonal temperature gradients up to 480° F. in first zone 42. It is to be noted that heat may be imparted through the center of screw feed mechanism 32 or the heat may be applied by air within masticator system 28, oil or even electric bands mounted on the exterior surfaces of extruder or masticator system 28.

Additionally, masticator or extruder system 28 may be jacketed, which provides for a jacketed outer wall where heated air, oil or other heat transfer medium is heated to provide the internal temperature gradients. It is of importance that the first intermediate mixture composition entering at entrance 26 be transiently heated through particular increasing zonal changes of temperature to produce the compounding effect establishing the final asphalt modifier compound exiting at exit 30.

Pelletized or granulated asphalt modifier or final mixture composition may be incorporated into the asphalt liquid binder in either what may be termed a wet process or a dry process. The final mixture weight percentage of the final mixture composition or asphalt modifier to the actual asphalt binder being used is approximately within the range of 5.0%–20.0% of the liquid asphalt binder. A preferred range of 5.0%–15.0% of final mixture composition to asphalt liquid binder provides for a more stable final asphalt product composition when used in road construction.

The final mixture composition may be used within the wet process system as depicted by block 38 shown in the FIGURE. In the wet process configuration, the final mixture is added to the asphalt binder at the refinery. Blending between the overall range of 5.0%–20.0% of the final mixture is provided into the blending tanks at the asphalt plant where the asphalt is maintained at a temperature approximating 280° F.–350° F. The final mixture composition is merely blended with well known techniques to the heated asphalt to produce the final asphalt product.

In the dry process, the particles or particulates of the final mixture composition are added to the aggregate form forming the asphalt which is mixed in the field. The dry process is depicted by block 40 of the FIGURE where the final mixture composition egresses from asphalt modifier system 10 and is mixed at the asphalt plant and fed into the hot asphalt. Thus, in the dry process the final mixture composition is conveyed into the asphalt batch plant at the aforementioned weight percentage levels and blended with the asphalt to produce the final asphalt product.

Although this invention has been described in connection with specific forms and embodiments thereof, it will be appreciated that various modifications other than those discussed above may be resorted to without departing from the spirit or scope of the invention. For example, equivalent elements and steps may be substituted for those specifically shown and described, certain features may be used independently of other features, and in certain cases, particular locations of elements or steps may be reversed or interposed, all without departing from the spirit or scope of the invention as defined in the appended claims.

What is claimed is:

1. A method of producing an asphalt product including the steps of:

(a) establishing a chemical mixture formed of a combination of fatty acids and hydrocarbon solvents;

(b) providing at least a partially vulcanized rubber composition;

(c) blending said chemical mixture with said rubber composition in a weight ratio to form a first intermediate mixture composition;

(d) introducing said first intermediate mixture composition into a masticator;

(e) heating said first intermediate mixture composition to a first temperature within a first zone of said masticator;

(f) cooling said heated first intermediate mixture composition to a second temperature within a second zone of said masticator to form a second intermediate mixture composition;

(g) re-heating said cooled second intermediate mixture composition to a third temperature within a third zone of said masticator to form a final mixture composition;

(h) extruding said final mixture composition from said masticator; and, (i) incorporating said extruded final mixture composition within a liquid asphalt binder to form said asphalt product.

2. The method of producing an asphalt product as recited in claim 1 where the step of heating said first intermediate mixture composition to said first temperature includes the step of venting volatile substances external said masticator formed in said first zone.

3. The method of producing an asphalt product as recited in claim 2 where said chemical mixture has a density within the approximating specific gravity range of 0.97 to 1.1.

4. The method of producing an asphalt product as recited in claim 3 where said chemical mixture has a boiling point approximating 280° C.

5. The method of producing an asphalt product as recited in claim 1 where the step of introducing said first intermediate composition into said masticator includes the step of establishing said first intermediate mixture composition at approximately room temperature.

6. The method of producing an asphalt product as recited in claim 1 where the step of heating said first intermediate mixture composition includes the step of increasing the temperature of said first intermediate mixture composition to said first temperature approximating 485° F. in said first zone of said masticator.

7. The method of producing an asphalt product as recited in claim 6 where the step of increasing the temperature of said first intermediate mixture composition to said first temperature includes the step of passing said first intermediate mixture composition through a plurality of contiguous and sequential heating sub-zones within said masticator first zone for monotonically increasing the temperature of said first intermediate mixture composition.

8. The method of producing an asphalt product as recited in claim 7 where the step of passing said first intermediate mixture composition through said contiguous and sequential heating sub-zones includes the step of raising the temperature of said first intermediate mixture composition to a temperature approximating 200° F. in a first sub-zone of said first zone of said masticator.

9. The method of producing an asphalt product as recited in claim 8 where the step of passing said first intermediate mixture composition through said contiguous and sequential heating sub-zones includes the step of further raising the temperature of said first intermediate mixture composition to a temperature approximating 485° F. in a second sub-zone of said first zone of said masticator.

10. The method of producing an asphalt product as recited in claim 1 where the step cooling said heated first intermediate mixture composition includes the step of lowering said heated intermediate mixture composition temperature in said second zone to said second temperature within the approximate range of 230° F. to 250° F.

11. The method of producing an asphalt product as recited in claim 1 where the step of re-heating said cooled second intermediate mixture composition includes the step of raising said cooled second intermediate mixture composition in said third zone of said masticator to said third temperature within the approximate range of 290° F. to 350° F.

12. The method of producing an asphalt product as recited in claim 1 where the step of providing at least a partially vulcanized rubber composition includes the step of providing scrap tires formed of a vulcanized rubber composition having polyester cord compositions contained therein.

13. The method of producing an asphalt product as recited in claim 12 where the step of heating said first intermediate mixture composition to said first temperature includes the step of melting said polyester cord and compounding said melted polyester cord with said vulcanized rubber composition.

14. The method of producing an asphalt product as recited in claim 1 where the step of cooling said heated first intermediate mixture composition includes the step of lowering said heated first intermediate mixture composition to said second temperature below a vulcanization temperature of said at least partially vulcanized rubber composition.

15. The method of producing an asphalt product as recited in claim 14 where said second temperature is within the approximate range of 230° F. to 250° F.

16. The method of producing an asphalt product as recited in claim 1 where the step of providing at least a partially vulcanized rubber composition includes the step of shredding said at least partially vulcanized rubber composition.

17. The method of producing an asphalt product as recited in claim 16 where the step of shredding includes the step of establishing a mesh size of said at least partially vulcanized rubber composition within the approximate range of 0.5–3.0 mm.

18. The method of producing an asphalt product as recited in claim 17 where said mesh size of said at least partially vulcanized shredded rubber composition is less than 2.0 mm.

19. The method of producing an asphalt product as recited in claim 1 where the step of providing said at least partially vulcanized rubber composition includes the step of removing contaminants from said rubber composition.

20. The method of producing an asphalt product as recited in claim 19 where the step of removing contaminants includes the step of removing steel particles from said rubber composition.

21. The method of producing an asphalt product as recited in claim 1 where the step of blending includes a chemical mixture weight to a rubber composition weight ratio within the approximating range of 0.01 to 0.1.

22. The method of producing an asphalt product as recited in claim 1 where the step of blending includes said chemical mixture forming approximately 10.0% of a total weight of said first intermediate mixture composition.

* * * * *